March 7, 1961        H. NERWIN        2,973,699
APPARATUS FOR COMPENSATING BATTERY DECAY
Filed July 2, 1958
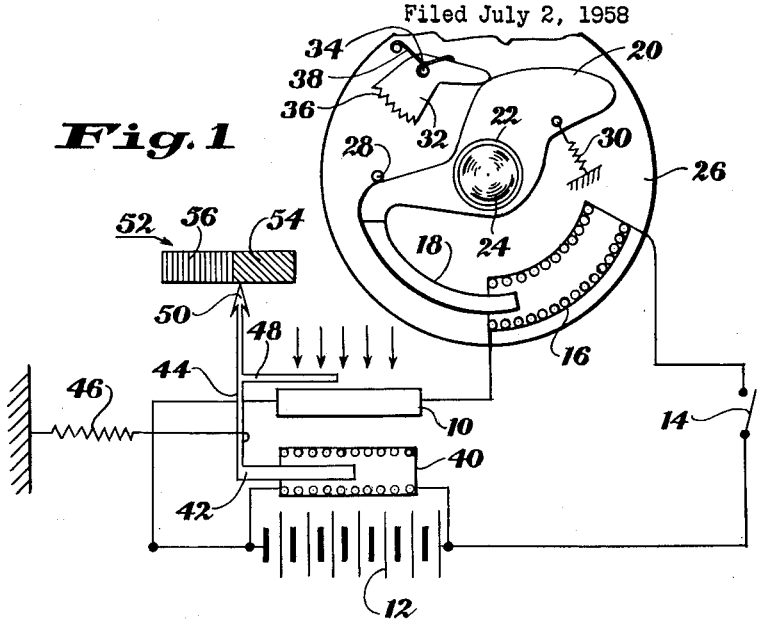
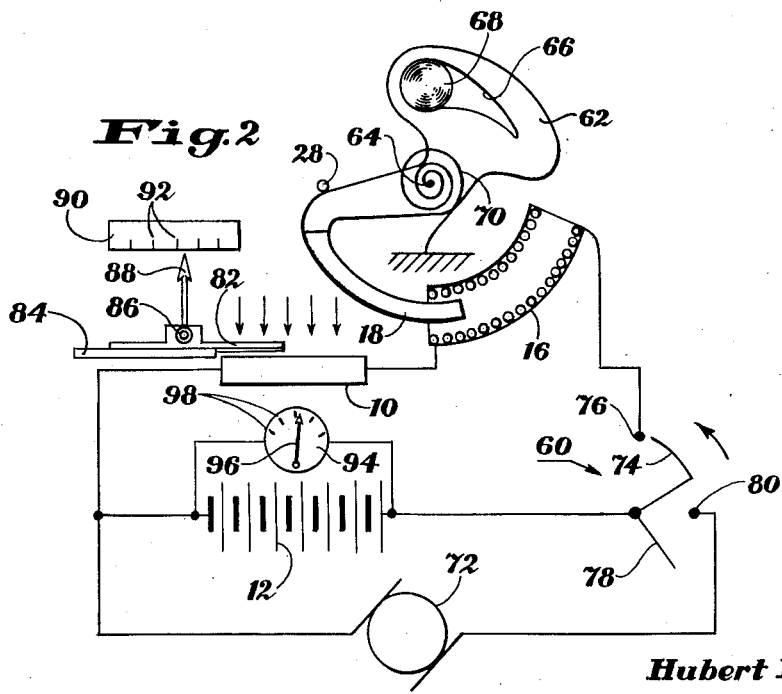
Hubert Nerwin
INVENTOR.
BY R. Frank Smith
Robert W. Hampton
ATTORNEYS

United States Patent Office 2,973,699
Patented Mar. 7, 1961

2,973,699

APPARATUS FOR COMPENSATING BATTERY DECAY

Hubert Nerwin, Rochester, N.Y., assignor to Eastman Kodak Company, Rochester, N.Y., a corporation of New Jersey Filed July 2, 1958, Ser. No. 746,176

9 Claims. (Cl. 95—10)

The present invention relates to automatic exposure control systems for photographic cameras and more particularly relates to apparatus for compensating variations in the output of an electrical power source used in such systems.

Automatic exposure control systems are well known in the art. A typical system of this class employs a photoelectric cell for viewing the scene, with a moving-coil instrument of the galvanometer type or a relay of the solenoid type connected to the cell for translating the electrical output of the cell into a mechanical movement. In turn, the mechanical movement is used either directly or indirectly to adjust the diaphragm opening or the shutter speed of the camera.

The photoelectric cells used in automatic exposure control systems may be divided into two classes, known, respectively, as photovoltaic and photoconductive cells. A photovoltaic cell is used principally to provide a voltage output that is a function of the light intensity incident on the cell. A photoconductive cell, on the other hand, is generally used as a photoresistive device, i.e., power is supplied from an independent source and the cell functions as a resistance element whose resistance varies inversely with the light intensity.

If a photoresistive element is used in the exposure control system, its power may be supplied from a small battery, thereby rendering the camera fully portable. Since the voltage output from batteries is known to decay with time, it is desirable to provide means for compensating this decay and thereby render the exposure control system of the camera stable with respect to time. It is therefore a principal object of the invention to compensate for decreasing battery voltage in the automatic exposure control system of a camera. More specifically, it is an object to adjust the position of a photocell mask as a function of the output voltage of a battery, such that the exposed area of the photocell is an inverse function of that output voltage.

Other objects of the invention will appear from the following description, reference being made to the accompanying drawings, wherein:

Fig. 1 is a schematic drawing illustrating automatic battery compensation in a still camera wherein the shutter speed is set by the exposure control system; and Fig. 2 is a schematic drawing illustrating manual battery compensation in a motion picture camera wherein the diaphragm opening is set by the exposure control system.

Referring to Fig. 1, a photoelectric cell 10, preferably of the photoconductive type, receives light from the scene that is to be photographed, as shown by the arrows. Cell 10 is connected in series with a source of steady-state voltage, illustrated as a battery 12, and in series with a normally open switch 14 and an arcuate relay coil 16. The relay coil has an arcuate plunger-type armature 18 formed of thin magnetizable material such as steel. The armature 18 is integral with a lightweight cam 20, formed for example of thin aluminum. Cam 20 is pivoted on a ring 22 that surrounds the lens aperture 24 of a still camera and is mounted on a fixed plate 26 of that camera. Armature 18 and cam 20 are normally maintained against a fixed stop 28 by a spring 30, such that armature 18 enters a short distance into coil 16, as illustrated in Fig. 1. A bell crank 32 is pivoted at 34 on plate 26 and has a gear segment 36 on one end. The other end of the bell crank is urged into engagement with the surface of cam 20 by a spring 38. Bell crank 32 and its gear segment 36 consittute the driving member of the retarding mechanism of a shutter and are well known in the art. They are disclosed, for example, in U.S. Patent No. 2,331,569, granted October 12, 1943, to Pirwitz. Cam 20 replaces the usual shutter speed ring that is used to position bell crank 32 for setting the shutter speed.

Upon closure of switch 14, a circuit is completed from battery 12 through cell 10 and coil 16. The resistance of cell 10 is an inverse function of the intensity of the light falling on the cell. Therefore, coil 16 is energized and rotates cam 20 and bell crank 32 in proportion to the light intensity and sets the shutter speed to a value such that the exposure duration is inversely related to the light intensity.

Where a battery is employed as the power source 12, its inherent decrease of output voltage with time may be compensated in the following manner. A coil 40 of a second solenoid-type relay is connected in series with battery 12 and in parallel with the photocell circuit. An armature 42 cooperates with coil 40 and has an arm 44 that is urged away from coil 40 by a spring 46. A mask 48 that is integral with arm 44 or otherwise driven by that arm overlies a part of the photocell 10. When the battery 12 is new and its output voltage is relatively high, it energizes coil 40 sufficiently to pull armature 42 well into the coil against the tension of spring 46; therefore mask 48 covers a substantial portion of the photocell to limit the area of the photocell that is exposed to the light from the viewed scene. As the battery becomes weaker with age, armature 42 and mask 48 are moved further away from coil 40 and photocell 10, respectively, by spring 46; therefore, a greater portion of the photocell is exposed to the light and the resistance of the photocell is decreased more by a given intensity of light. Consequently, the energization of coil 16 remains substantially constant for a given light intensity, even though the voltage output from the battery decreases.

A pointer 50 that is integral with arm 44 of armature 42 cooperates with a scale 52, which is visible from the outside of the camera. Scale 52 may be divided, for example, into two portions 54 and 56 of different colors, the first indicating that the battery voltage is sufficiently high to operate the exposure control system effectively and the second indicating the necessity of battery replacement.

Referring to Fig. 2, the invention is shown as applied to setting the diaphragm opening in a motion picture camera. In this case, there may be an electric drive motor operated by battery 12; therefore the photocell circuit from the battery 12 is completed through a double-pole switch 60. Armature 18 of the relay is integral with a diaphragm vane 62, which is preferably formed of thin aluminum and which is pivoted at 64. Diaphragm vane 62 has a teardrop aperture 66 that overlies and cooperates with a fixed aperture 68 of the camera. The armature 18 and its integral vane 62 are normally held against the fixed stop 28 by a spring 70. In this position of vane 62, the larger end of aperture 66 overlies the fixed aperture 68, permitting maximum light to enter the camera.

When switch 60 is closed, coil 16 is energized and rotates armature 18 and vane 62 in proportion to the light intensity and thereby positions the appropriate portion of aperture 66 over aperture 68, such that the area of the combined aperture is an inverse function of the light intensity.

Battery 12 also may be connected, by means of the normally open switch 60, in series with a drive motor 72 for the camera. The motor circuit is in parallel with the circuit for photocell 10. Switch 60 comprises an arcuate first arm 74 that cooperates with a contact 76 for the photocell circuit and a second arm 78 that cooperates with a contact 80 for the motor circuit. The arrangement of arms 74 and 78 is such that upon closure of switch 60 by movement of its arms in the direction shown by the arrow, arm 74 engages contact 76 before arm 78 engages contact 80. Therefore the photocell circuit is energized before the motor circuit, and vane 62 is positioned in accordance with the light intensity before the drive motor begins to operate for exposing the first frame of film.

Fig. 2 also shows manually operated means for carrying out the battery-compensating method of the present invention. A mask 82 is slidably mounted on a support member 84 and has a knob 86 by which the mask can be moved to any desired position with respect to cell 10. A pointer 88 integral with mask 82 cooperates with a scale 90 having a series of marks 92. A direct current voltmeter 94 of any well-known type is connected in series with battery 12 and in parallel with the photocell and motor circuits. The usual indicating pointer 96 of the meter cooperates with a series of scale marks 98 that are spaced to correspond to the marks 92 on scale 90.

In operation, meter 94 measures the voltage output of battery 12 and provides a visual indication of that voltage in terms of the position of pointer 96 relative to scale marks 98. The camera operator reads the meter scale and manually adjusts mask 82 relative to cell 10 until the position of pointer 88 relative to scale marks 92 corresponds to the position of pointer 96 relative to scale marks 98.

The invention has been described in detail with particular reference to preferred embodiments thereof, but it will be understood that variations and modifications can be effected within the spirit and scope of the invention as described hereinabove and as defined in the appended claims. In particular, it is understood that an automatically operated battery compensator, as shown in Fig. 1 in a still camera, may be used in a motion picture camera, and that a manually operated battery compensator, as shown in Fig. 2 in a motion picture camera, may be used in a still camera.

I claim:

1. In a camera having: (1) a power source whose voltage output decreases with time; (2) a photoelectric cell for receiving light from a viewed scene; and (3) an exposure control system connected to and controlled jointly by said photoelectric cell and said power source for varying at least one exposure factor in response to changes in the intensity of said light; the combination comprising: a mask interposed between said scene and said cell and adapted for movement relative to said cell for exposing a varying portion of said cell to said scene; and a device connected to and controlled solely by said power source for moving said mask relative to said cell in response to a decrease in the voltage output of said power source.

2. The combination defined in claim 1, wherein said power source comprises a battery and said device comprises a relay having: (1) a coil connected to said battery and energized thereby; and (2) an armature cooperating with said coil for movement relative thereto, said armature being connected to said mask for moving the mask relative to said cell.

3. The combination defined in claim 1, with: a visible scale mounted on said camera; and a pointer cooperating with said scale and moved by said device.

4. The combination defined in claim 1, wherein said photoelectric cell is of the photoconductive type.

5. In a camera having: (1) a battery whose voltage output decreases with respect to time; (2) a photoresistive element for receiving light from a viewed scene; (3) a shutter; and (4) a shutter-speed setting member for predetermining the operating speed of said shutter; the combination comprising: means interconnecting said battery, said element and said member for adjusting said member in response to changes in the intensity of said light; a mask interposed between said scene and said element and adapted for movement relative to said element for exposing a varying portion of said element to said light; and means interrelating said battery and said mask for controlling said mask solely by said battery, thereby to move said mask for exposing a greater portion of said element in response to a decrease in the voltage output of said battery.

6. The combination defined in claim 5, wherein said interrelating means includes a relay.

7. In a camera having: (1) a battery whose voltage output decreases with time; (2) a photoresistive element for receiving light from a viewed scene; (3) an exposure aperture; (4) a diaphragm for varying the size of said aperture; and (5) means interconnecting said battery, said element and said diaphragm for varying the size of said aperture in response to changes in the intensity of said light; the combination comprising: a mask interposed between said scene and said element and adapted for movement relative to said element for exposing a varying portion of said element to said light; and means interrelating said battery and said mask for controlling said mask solely by said battery, thereby to move said mask for exposing a greater portion of said element in response to a decrease in the voltage output of said battery.

8. The combination defined in claim 7, wherein said interrelating means includes a relay having a coil connected to said battery and an armature connected to said mask.

9. The combination defined in claim 1, with an indicator visible from the outside of the camera and having a movable element controlled by said power source to indicate, by the position of said movable element, the output voltage of said power source relative to a predetermined value of output voltage.

References Cited in the file of this patent

UNITED STATES PATENTS

| | | |
|---|---|---|
| 1,813,635 | Myers | July 7, 1931 |
| 1,934,484 | Camilli | Nov. 7, 1933 |
| 2,013,362 | Riszdorfer | Sept. 3, 1935 |
| 2,032,633 | Riszdorfer | Mar. 3, 1936 |
| 2,163,737 | Prinsen | June 27, 1939 |
| 2,297,262 | Tonnies | Sept. 29, 1942 |
| 2,453,693 | Armstrong | Nov. 16, 1948 |
| 2,630,049 | Stein | Mar. 3, 1953 |
| 2,674,700 | Small | Apr. 6, 1954 |
| 2,780,971 | Fahlenberg | Feb. 12, 1957 |
| 2,800,844 | Durst | July 30, 1957 |
| 2,855,523 | Berger | Oct. 7, 1958 |